(12) United States Patent
Kubo et al.

(10) Patent No.: US 8,888,167 B2
(45) Date of Patent: Nov. 18, 2014

(54) BODY STRUCTURE OF VEHICLE

(75) Inventors: Satoshi Kubo, Kariya (JP); Yasuo Imai, Kariya (JP); Yoshinobu Itou, Kariya (JP); Daisuke Oozawa, Kariya (JP); Kenji Ishii, Kariya (JP); Jun Inagaki, Kariya (JP); Takahiro Tatsuno, Kariya (JP); Kazuhiko Katou, Kariya (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/808,555

(22) PCT Filed: Mar. 25, 2011

(86) PCT No.: PCT/JP2011/057332
§ 371 (c)(1),
(2), (4) Date: Mar. 18, 2013

(87) PCT Pub. No.: WO2012/023303
PCT Pub. Date: Feb. 23, 2012

(65) Prior Publication Data
US 2013/0169003 A1   Jul. 4, 2013

(30) Foreign Application Priority Data
Aug. 19, 2010 (JP) ................................. 2010-183698

(51) Int. Cl.
*B62D 25/08* (2006.01)
*B62D 21/15* (2006.01)
*B60R 16/04* (2006.01)

(52) U.S. Cl.
CPC ............ *B62D 25/082* (2013.01); *B62D 21/152* (2013.01); *B60R 16/04* (2013.01)
USPC ............... 296/187.09; 296/187.1; 296/193.09

(58) Field of Classification Search
CPC .... B62D 21/11; B62D 25/081; B62D 25/082; B62D 25/085
USPC ............... 296/187.03, 187.09, 187.1, 187.12, 296/192, 193.01, 193.09, 198
See application file for complete search history.

(56) References Cited

U.S. PATENT DOCUMENTS

| | | | |
|---|---|---|---|
| 5,476,151 A | 12/1995 | Tsuchida et al. | |
| 7,144,073 B2 * | 12/2006 | Uchida | ............ 296/203.02 |

FOREIGN PATENT DOCUMENTS

| | | | |
|---|---|---|---|
| DE | 10 2006 057 834 A1 | 6/2008 | |
| EP | 1 182 093 A1 | 2/2002 | |
| EP | 1 707 475 A2 | 10/2006 | |
| FR | 2 918 002 A1 | 1/2009 | |
| JP | 2-100860 U | 8/1990 | |
| JP | 06-344946 A | 12/1994 | |
| JP | H0728057 Y2 * | 6/1995 | |
| JP | 11-105737 A | 4/1999 | |

(Continued)

*Primary Examiner* — Glenn Dayoan
*Assistant Examiner* — Jason S Daniels
(74) *Attorney, Agent, or Firm* — Christensen Fonder P.A.

(57) ABSTRACT

A dash panel has an impact absorption portion formed therein. A suspension tower is connected to the impact absorption portion, so that support stiffness thereof can be ensured. In addition, the suspension tower can be rotated around the front pillar due to an impact, so that an amount of backward movement of the dash panel toward a vehicle interior can be reduced. Thus, a brake booster cannot substantially be moved backward, so that a brake pedal and a steering column can be prevented from being displaced in an upward and backward projecting direction. As a result, a vehicle interior can be protected.

3 Claims, 5 Drawing Sheets

(56) References Cited

FOREIGN PATENT DOCUMENTS

| JP | 2002-225750 A | 8/2002 |
| JP | 2002-370672 A | 12/2002 |
| JP | 2003-154969 A | 5/2003 |
| JP | 2004-276789 A | 10/2004 |
| JP | 2006-240518 A | 9/2006 |
| JP | 4022846 B2 | 2/2007 |
| JP | 4122895 B2 | 7/2008 |
| JP | 2009-255883 A | 11/2009 |
| JP | 2010-000864 A | 1/2010 |
| JP | 2010-006307 A | 1/2010 |
| JP | 2010-173422 A | 8/2010 |

* cited by examiner

BODY STRUCTURE OF VEHICLE

PRIORITY CLAIM

The present application is a National Phase entry of PCT Application No. PCT/JP2011/057332, filed Mar. 25, 2011, which claims priority from Japanese Patent Application No. 2010-183698, filed Aug. 19, 2010, the disclosures of which are hereby incorporated by reference herein in their entirety.

TECHNICAL FIELD

The present invention relates to a body structure of a front portion of a vehicle. In particular, the present invention relates to a body structure of an engine room in which an engine is received.

BACKGROUND ART

In a vehicle having a body structure in which an engine room (an engine compartment) is positioned in front of a vehicle cabin (a cabin) in which a passenger gets, when a large impact is applied thereto from a front side due to a vehicle frontal collision or other such accidents, the impact can be efficiently absorbed due to deformation of a vehicle front portion. As a result, deformation of the vehicle interior can be minimized. At the same time, backward movement of a dash panel can be restricted. Thus, the passenger can be protected. Conventional techniques relating to impact absorption in the front portion of the vehicle and restriction of the backward movement of the dash panel are taught by patent documents described below.

In a technique taught by Japanese Patent No. 4022846, a reinforcement member is attached to an upper portion of a dash panel between right and left suspension towers so as to increase lateral stiffness thereof. Also, a reinforcement member is interleaved between each of right and left end portions of the dash panel and each of front pillars so as to increase surface stiffness of the dash panel. Thus, an amount of backward movement of the dash panel can be reduced.

In a technique taught by Japanese Patent No. 4122895, a crushable zone is formed behind an engine so as to absorb an impact at the time of a vehicle frontal collision.

In a technique taught by Japanese Laid-Open Patent Publication No. 2002-370672, formed between an outer cross member and a dash panel is an area that is relatively easily deformable by an impact at the time of a frontal collision, so that backward movement of the dash panel can be restricted.

In a technique taught by Japanese Laid-Open Patent Publication No. 2010-846, suspension towers for supporting a suspension are connected to side portions of a dash panel such that a suspension input load can be received by the dash panel. Thus, the suspension towers can be prevented from being inclined inwardly, so as to ensure a stability of steering.

In a technique taught by Japanese Laid-Open Patent Publication No. 2003-154969, a bulged portion is formed in a cross member positioned in front of a dash panel. Thus, a load at the time of a frontal collision can be absorbed and then be transmitted to and dispersed in a floor, so that backward movement of the dash panel can be restricted.

In a technique taught by Japanese Laid-Open Patent Publication No. 2002-225750, a weakened portion is formed between a vertical surface and a horizontal surface of a battery bracket. Thus, the battery bracket may have a sufficient support strength for a large battery and a stabilized shock absorbing function due to deformation of the weakened portion.

However, these conventional techniques may be difficult to be directly applied to a vehicle in which a space of an engine room positioned on a vehicle front portion is reduced in a back and forth direction. Therefore, it is necessary to provide the engine room with a high shock absorbing function by means other than the conventional techniques.

For example, even in a vehicle having a narrow engine compartment, suspension towers can be directly connected to a dash panel in order to ensure lateral stiffness of the suspension towers. Thus, the suspension towers can receive a large suspension load. However, in such a structure, an amount of backward movement of the dash panel may be increased. Generally, it is important that an amount of backward movement of a brake booster, an amount of upward and backward projection of a brake pedal, an amount of upward projection of a steering wheel and an amount of penetration of a toe board can be minimized at the time of a vehicle frontal collision. All of these amounts may depend on the amount of backward movement of the dash panel. As a result, even when the suspension towers are directly connected to the dash panel, a special technique is required in order to minimize the amount of backward movement of the dash panel caused by a large impact due to the vehicle frontal collision or other such accidents.

Thus, there is a need in the art to provide an improved vehicle body structure.

SUMMARY OF THE INVENTION

A first aspect of the present invention provides a body structure of a vehicle in which an engine room and a vehicle interior are separated by a dash panel, in which a pair of right and left suspension towers supporting suspensions are disposed in the engine room, in which a brake booster is supported on a front surface of the dash panel while being positioned behind the suspension tower, and in which a brake pedal and a steering column are supported on a rear surface of the dash panel, wherein a battery is positioned in front of the suspension tower, and wherein when the battery moves backward by an impact applied from a vehicle front side, the suspension tower can be pushed by the battery, so as to move backward while rotating around a front pillar.

According to the first aspect of the present invention, when a large impact is applied to a vehicle front portion from the front side due to a vehicle frontal collision or other such accidents, the battery moves backward and pushes the suspension tower backward. As a result, the suspension tower can displace backward while rotating around the front pillar, so as to move backward while avoiding the brake pedal that is positioned behind the suspension tower. Therefore, even when the suspension tower is connected to the dash panel, the brake booster, the brake pedal and the steering column or other such devices can be prevented from being directly pushed by the suspension tower and moving backward. As a result, the suspension tower can be connected to the dash panel in order to increase lateral stiffness thereof against the suspension. At the same time, an amount of backward movement of the dash panel can be reduced, so that the vehicle interior can be protected.

In a second aspect of the present invention, an impact absorption portion bulged forward is formed in the front surface of the dash panel while being positioned below the brake booster, wherein the suspension tower is connected to the impact absorption portion, and wherein the impact absorption portion can be deformed by the impact applied from the vehicle front side, so that the suspension tower can be moved backward.

According to the second aspect of the present invention, when the large impact is applied from the front side at the time of the vehicle frontal collision or other such accidents, the suspension tower can be pushed by the battery and rotate around the front pillar, so as to move backward while crushing the impact absorption portion. At this time, the suspension tower can move backward while avoiding the brake booster or other such devices. Therefore, the dash panel can be further restricted from moving backward, so that the vehicle interior can be protected.

In a third aspect of the present invention, the dash panel is depressed toward the vehicle interior in a central portion thereof, wherein the impact absorption portion is formed in the one of right and left side portions of the dash panel, and wherein the suspension tower is connected to the dash panel 10 via the impact absorption portion as a rear wall.

According to the third aspect of the present invention, when the battery moves backward and pushes the suspension tower by the impact from the front side, the suspension tower can rotate around the front pillar, so as to crush the impact absorption portion while avoiding the brake booster. Thus, the impact can be absorbed, so that the dash panel can be restricted from moving backward. Further, because the dash panel is depressed toward the vehicle interior in the central portion thereof, surface stiffness of the dash panel can be increased. Therefore, the dash panel can be further reliably restricted from moving backward toward the vehicle interior.

In a fourth aspect of the present invention, a seat portion of a battery support supporting the battery is supported on a front side member via a leg portion, and wherein the leg portion is bent in transverse cross section in a central portion thereof in a back and forth direction so as to have a bent transverse cross-sectional configuration.

According to the fourth aspect of the present invention, the seat portion on which the battery is placed is supported on the front side member via the leg portion that is bent to L-shape in transverse cross section. Because the leg portion of the battery support is bent to L-shape in the central portion thereof in the back and forth direction, an opening side thereof is faced in a lateral direction. Therefore, the impact applied from the front side via the front side member can be applied to the leg portion as a bending force, so that the leg portion can be relatively easily deformed in a closing direction by the impact. Thus, due to axial stress of the leg portion that is bent to the L-shape in transverse cross section, the leg portion may have a sufficient support stiffness for the battery. In addition, when the large impact is applied to the front side member from the front side, the leg portion can be relatively easily deformed. As a result, the leg portion can move the battery backward without reducing axial compression efficiency of the front side member. As a result, the suspension tower can move backward while rotating around the front pillar. Therefore, the brake booster can be restricted from moving backward, so that the vehicle interior can be more reliably protected.

DETAILED DESCRIPTION OF THE INVENTION

Figure 1:
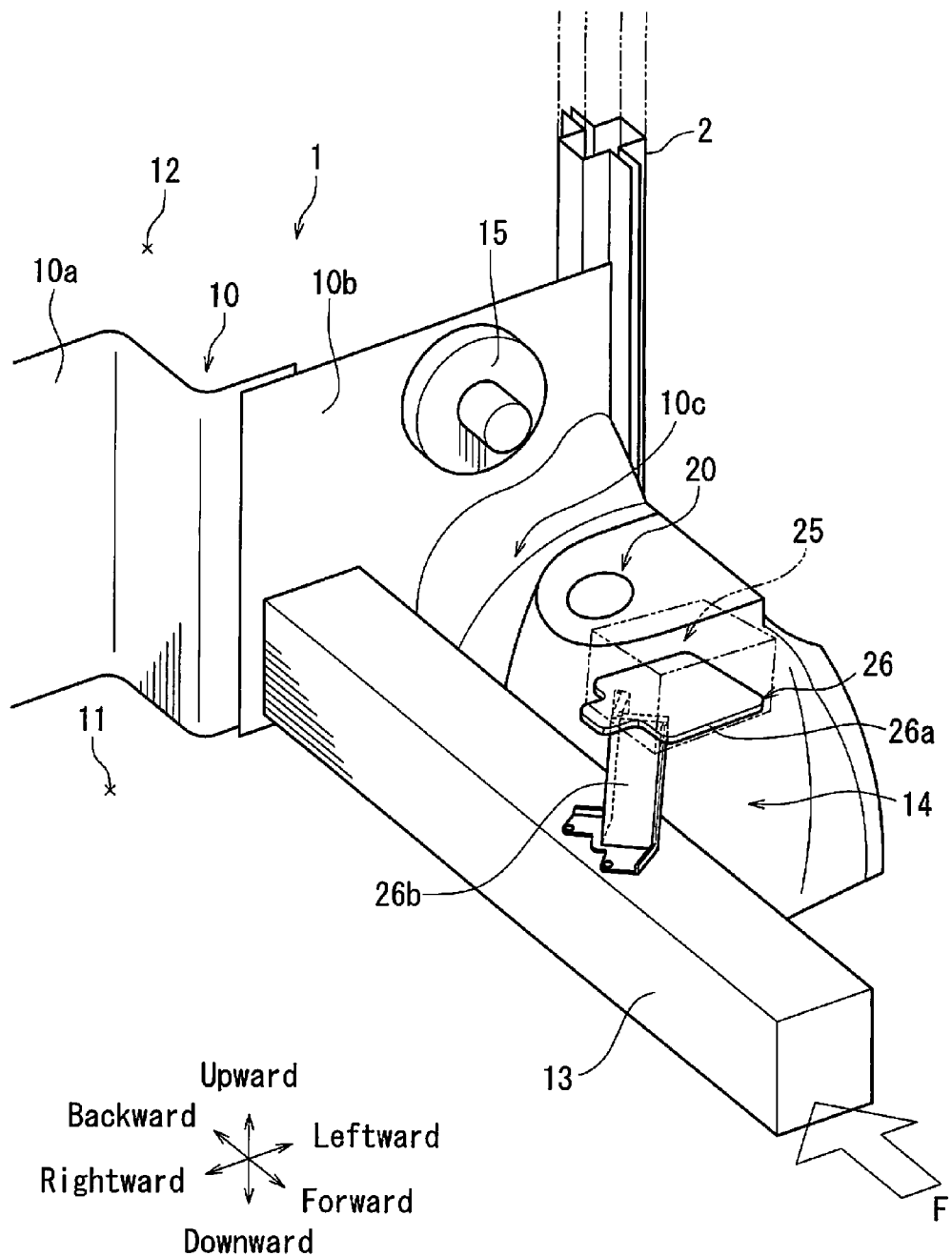
FIG. 1 is a perspective view of a body structure according to an embodiment of the present invention.

Next, an embodiment of the present invention will be described with reference to FIGS. 1 to 8(B). The present invention is characterized by a vehicle front portion, in particular by a structure of a front body in which an engine E/G is mainly received and to which front suspensions (not shown) are attached. FIGS. 1 and 6 schematically show a body structure 1 of the vehicle front portion. The body structure 1 is generally symmetrically formed. In FIG. 1, the body structure 1 in a vehicle left side is shown. In the drawings, a dash panel is identified by a reference numeral 10. The dash panel 10 separates an engine room 11 of the vehicle front portion and a vehicle interior (cabin) 12. The dash panel 10 may have a central dash center portion 10a depressed toward the vehicle interior 12 and right and left dash side portions 10b and 10b. In the present embodiment, the dash side portions 10b and 10b are connected to right and left peripheries of the dash center portion 10a so as to form the dash panel 10. However, the dash panel 10 can be integrally formed by press forming while a depressed portion is formed in a central portion thereof.

Right and left end portions of the dash panel 10, i.e., end portions of the right and left dash side portions 10b and 10b, may respectively be connected right and left front pillars 2.

Figure 2:
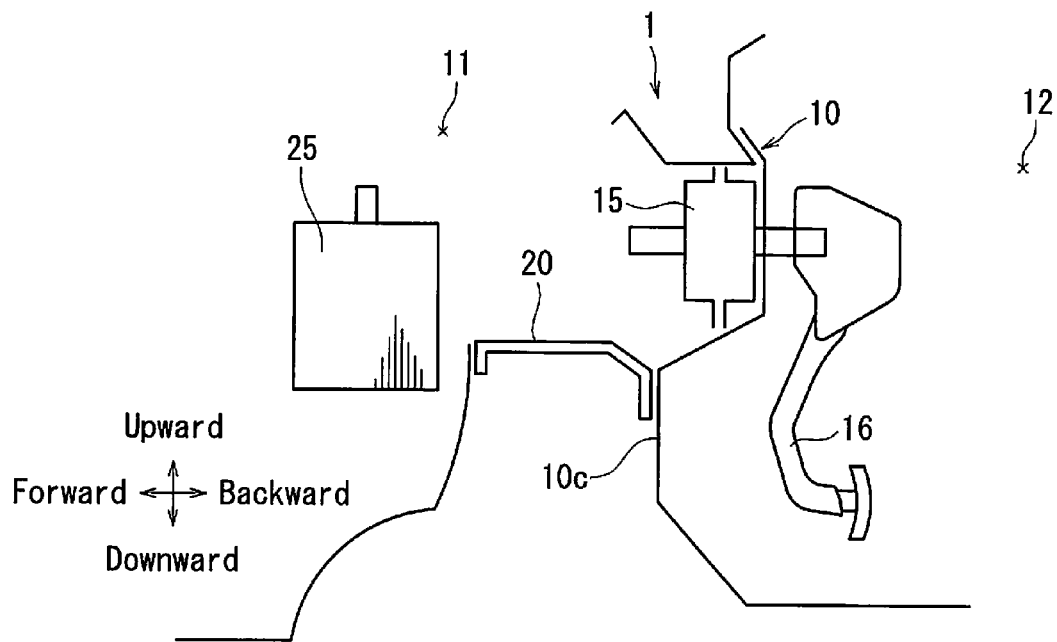
FIG. 2 is a side view of the body structure of a vehicle front portion. The view shows a condition in which an impact is not applied.
Figure 4:
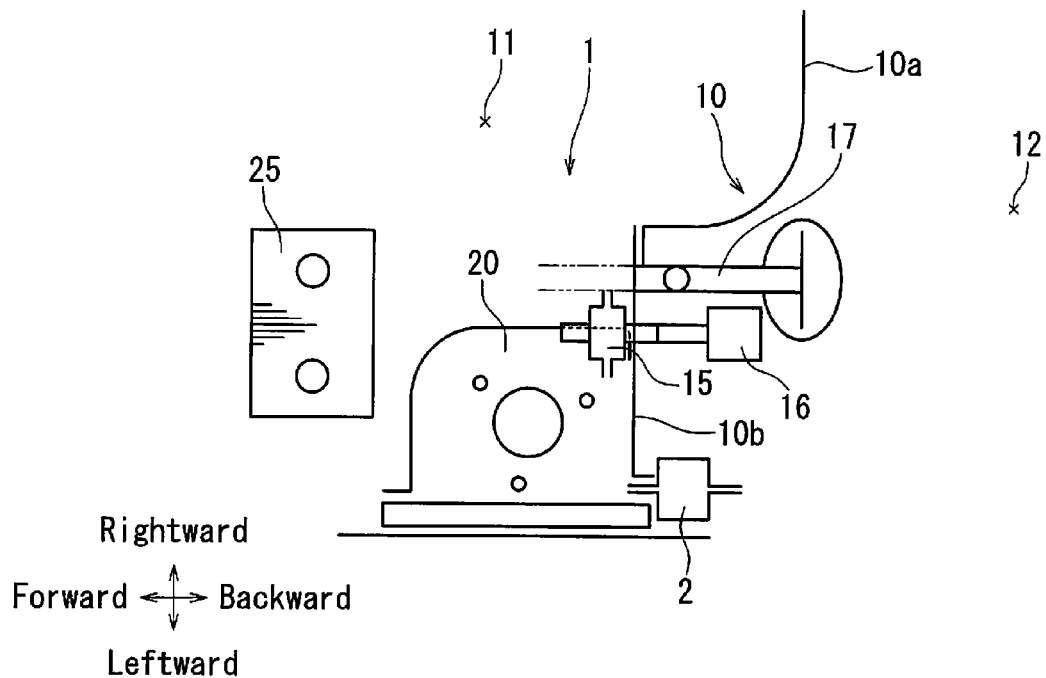
FIG. 4 is a plan view of the body structure of the vehicle front portion. The view shows the condition in which the impact is not applied.

A brake booster 15 is supported on the left dash side portion 10b of the dash panel 10. The brake booster 15 is supported on the left dash side portion 10b so as to be positioned in the engine room 11. Further, as shown in FIGS. 2 and 4, a brake pedal 16 and a steering column 17 are supported on the left dash side portion 10b so as to be positioned in the vehicle interior.

As shown in FIG. 1, a front side member 13 is projected forward from the left dash side portion 10b. A suspension tower 20 (which may be hereinafter referred to as a sus-tower) is positioned so as to extend upward from the left front side member 13. The left front suspension is supported on the suspension tower 20.

An inner fender (a hood ridge) 14 constituting a wheel house is connected to a front side of the sus-tower 20. The sus-tower 20 is directly connected to the left dash side portion 10b of the dash panel 10. The left dash side portion 10b of the dash panel 10 has an impact absorption portion 10c that is integrally formed therein so as to be bulged forward. The sus-tower 20 is integrally connected to the impact absorption portion 10c.

Figure 7:
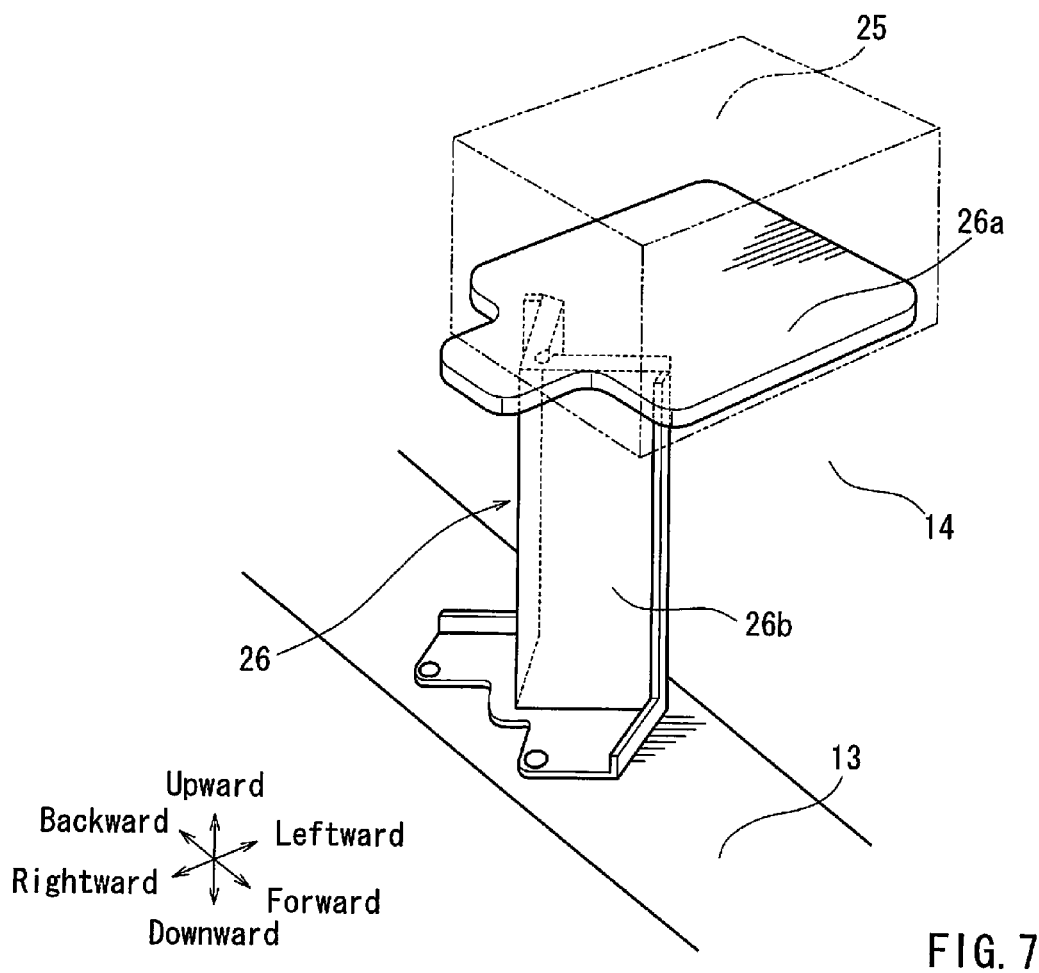
FIG. 7 is a perspective view of a battery support according to the present embodiment.
Figure 8:
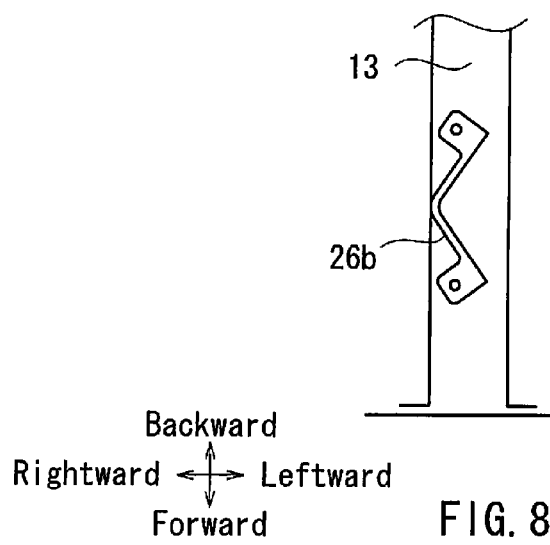
FIG. 8(A) is a plan view of the battery support, which view shows the condition in which the impact is not applied.
FIG. 8(B) is a plan view of the battery support, which view shows the condition in which the impact is applied.
Figure 8:
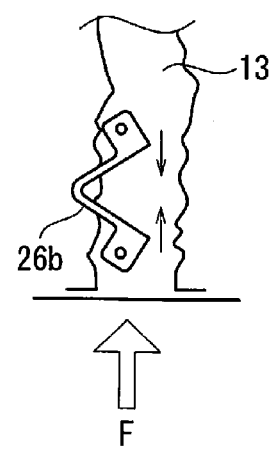

A battery 25 is positioned in front of the sus-tower 20 and above the left inner fender 14. The battery 25 is placed on a battery support 26. As shown in FIG. 7, the battery support 26 is composed of a flat plate-shaped seat portion 26a and a leg portion 26b. A rear portion of the seat portion 26a is connected to the inner fender 14. Conversely, a front portion of the seat portion 26a is supported on the front side member 13 via the leg portion 26b. Thus, the seat portion 26a is positioned horizontally. The battery 25 is placed on the seat portion 26a.

As shown in FIGS. 8(A) and 8(B), the leg portion 26b is bent in a widthwise substantially central portion so as to have an L-shape in transverse cross section. The leg portion 26b is connected to the front side member 13 while an opening side thereof is faced in a vehicle lateral direction. Therefore, a weight of the battery 25 loaded on the seat portion 26a can be strongly supported by an axial force of the leg portion 26b. To the contrary, as shown in FIGS. 8(A) and 8(B), when a large impact F is applied to the front side member 13 due to a vehicle frontal collision or other such accidents, the front side member 13 can be deformed, so that the leg portion 26b can be applied with a bending force in a closing direction. As a result, as shown in FIG. 8(B), the leg portion 26b can be relatively easily deformed (a V-shape) in the closing direction. When a transverse cross-sectional configuration of the leg portion 26b is deformed into the V-shape, support stiffness of the leg portion 26b against the weight of the battery 25 can be reduced. Therefore, axial compression efficiency of the front side member 13 (impact absorption capacity due to smooth deformation in an axial compression direction) cannot be reduced. In addition, the battery 25 placed on the seat portion 26a can be easily displaced backward by a force of inertia of the impact F.

As previously described, the sus-tower 20 is positioned behind the battery 25. In the present embodiment, as shown in FIG. 4, the battery 25 is positioned in front of the sus-tower 20 while it is slightly displaced rightward in a vehicle widthwise direction as viewed from above. Further, as shown in FIG. 2, the battery 25 is positioned in front of the sus-tower 20 while it is positioned in the proximity to an upper portion of the sus-tower 20 as viewed from the side.

Thus, when the battery 25 is moved backward by the large impact F due to the vehicle frontal collision or other such accidents, the battery 25 may strike a front upper portion and a inner corner portion of the sus-tower 20. When the battery 25, a heavy material, strikes the widthwise inner corner portion of the sus-tower 20 in the front upper portion of the sus-tower 20, a large turning force R centered on the front pillar 2 may act on the sus-tower 20. Due to the turning force R, the sus-tower 20 can be displaced backward while turning around the front pillar 2. As a result, the impact absorption portion 10c of the dash panel 10 can be crashed, so that the impact F can be absorbed.

Figure 5:
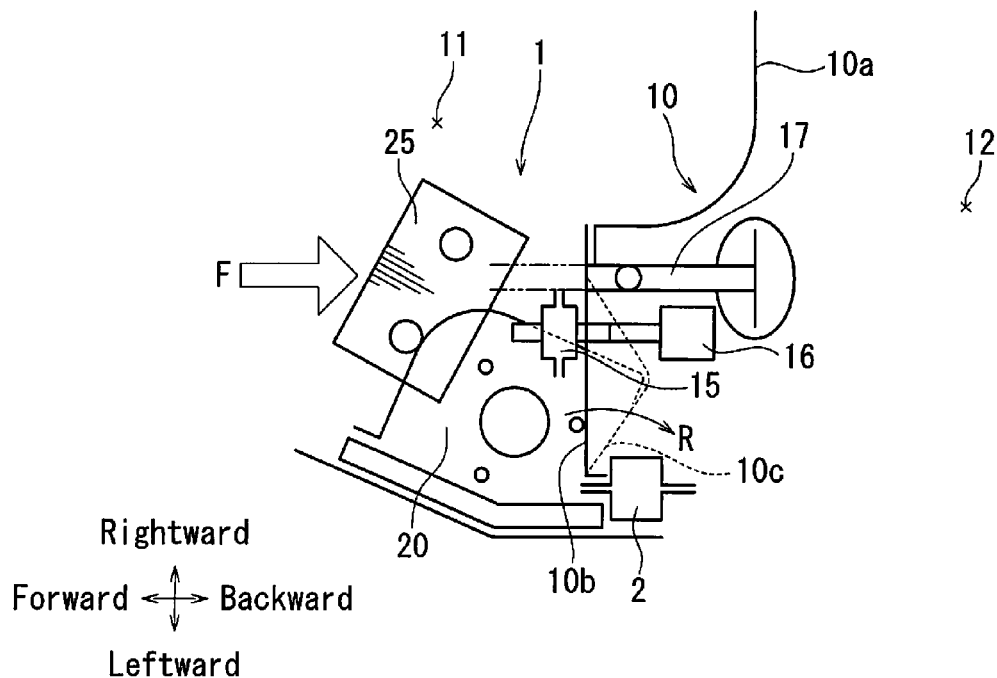
FIG. 5 is a plan view of the body structure of the vehicle front portion. The view shows the condition in which the impact from the vehicle front side is applied.
Figure 6:
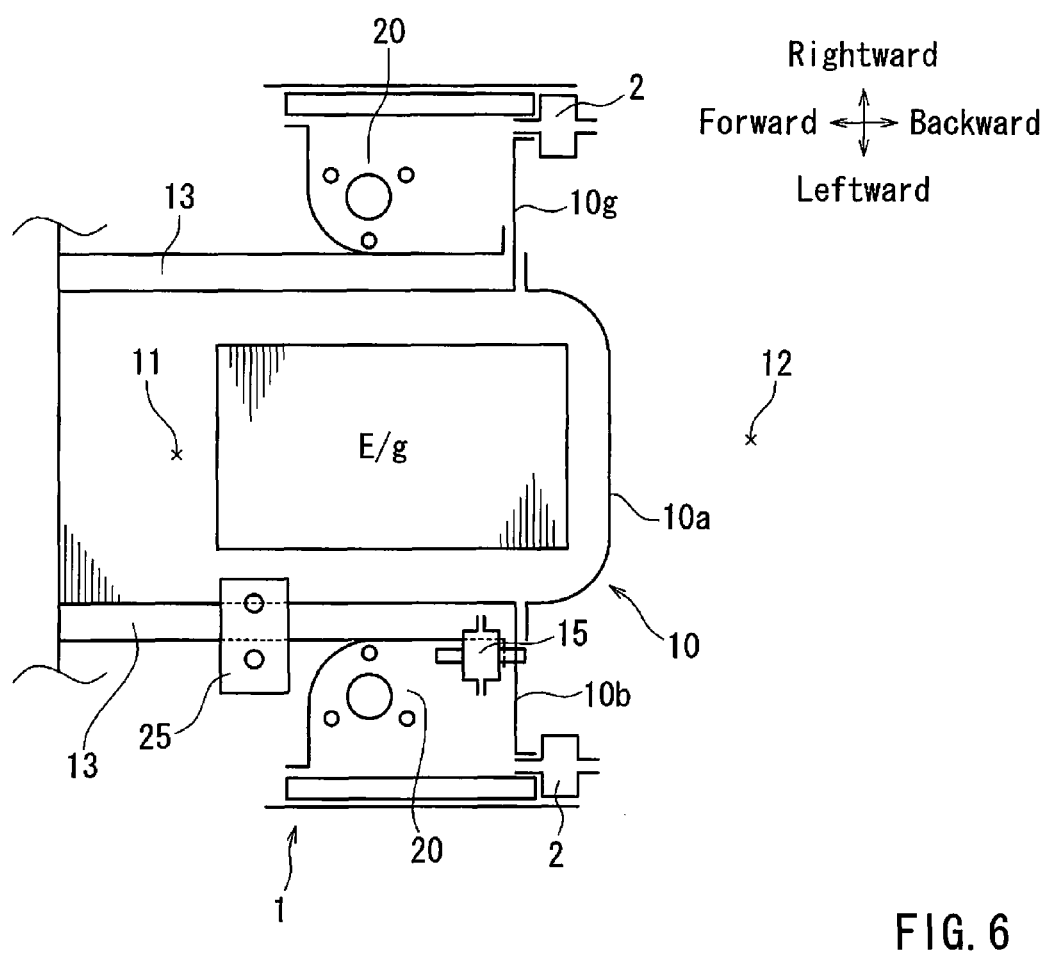
FIG. 6 is a plan view of the body structure according to the embodiment of the present invention.

Further, as shown in FIG. 5, because the sus-tower 20 can move backward while turning around the front pillar 2 due to backward movement of the battery 25, the brake pedal 16 can substantially be prevented from moving backward.

Figure 3:
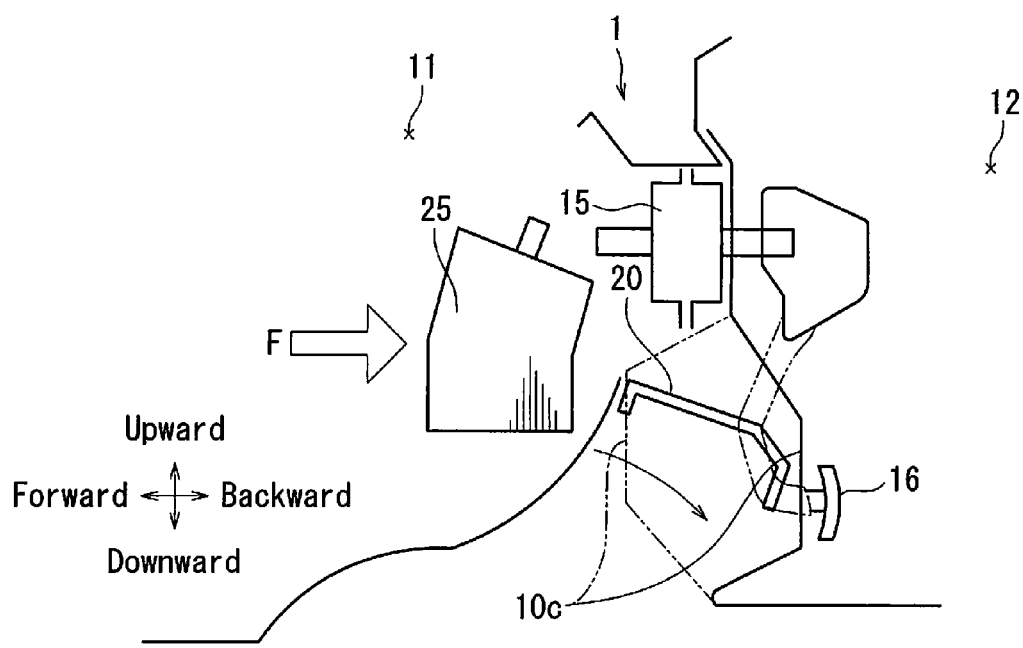
FIG. 3 is a side view of the body structure of the vehicle front portion. The view shows a condition in which the impact from a vehicle front side is applied.

Further, as shown in FIG. 3, when the battery 25 positioned in the front upper portion of the sus-tower 20 moves backward, the sus-tower 20 can move backward while crashing the impact absorption portion 10c, so as to be pushed under the brake booster 15. As a result, the brake booster 15 can be significantly restricted from being displaced toward the vehicle interior 12.

Thus, due to the large impact F at the time of the vehicle frontal collision or other such accidents, as viewed from above, the sus-tower 20 directly connected to the impact absorption portion 10c formed in the dash panel 10 can move backward by passing the side of the brake pedal 16 while avoiding the same and turning around the front pillar 2. Conversely, as viewed from the side, the sus-tower 20 can move backward by passing under the brake booster 15 while avoiding the same. As a result, when the sus-tower 20 moves backward, the brake booster 15 can be significantly restricted from being displaced toward the vehicle interior 12.

According to the body structure 1 of the present embodiment thus constructed, a positional relation of the battery 25 and the brake booster 15 relative to the sus-tower 20 connected to the dash panel 10 can be appropriately determined. When the battery 25 moves backward by the large impact F due to the vehicle frontal collision or other such accidents, the sus-tower 20 can move backward while avoiding the brake pedal 16 and rotating around the front pillar 2. Also, at this time, the sus-tower 20 can move backward by passing under the brake booster 15. Therefore, the dash panel 10 can be significantly restricted from moving backward, so that an amount of backward movement of the brake pedal 16 can be reduced. In addition, an amount of upward and backward projection of the steering column 17 can be reduced, so that the vehicle interior 12 can be protected.

Thus, the sus-tower 20 can be connected to the dash panel 10, so as to ensure sufficient lateral stiffness thereof against the suspension while the vehicle interior 12 can be protected at the time of the vehicle frontal collision or other such accidents. Because the sus-tower 20 can be directly connected to the impact absorption portion 10c of the dash panel 10 so as to ensure sufficient lateral stiffness of the front suspension while the vehicle interior 12 can be protected from the impact F caused by the vehicle frontal collision or other such accidents, additional reinforcement members as conventionally used are not necessary. Therefore, the body structure 1 can be appropriately applied to a small vehicle of which the engine room 11 has a small space in a back and forth direction.

Further, because the central dash center portion 10a of the dash panel 10 is depressed toward the vehicle interior 12, surface stiffness of the dash panel 10 can be increased. This may also restrict the dash panel 10 from moving backward toward the vehicle interior 12, so that the vehicle interior 12 can be effectively protected.

Further, in the present embodiment, the right and left dash side portions 10b and 10b are formed separately from the central dash center portion 10a by press forming and are connected thereto, so as to form the dash panel 10 (a divided dash panel structure). Thus, as compared with a dash panel that does not have a depressed portion and is entirely flattened in the vehicle widthwise direction, in the dash panel 10 of the present embodiment, an area of the flattened right and left dash side portions 10b and 10b can be significantly reduced. According to such a divided dash panel structure, a resonance point of the dash panel 10 to vibrations transmitted from a road surface can be reised. Therefore, the surface stiffness of the dash panel 10 can be increased without reducing anti-road noise performance (NV performance).

Further, because the central dash center portion 10a of the dash panel 10 is depressed toward the vehicle interior 12, the right and left dash side portions 10b and 10b can be shifted forward, so as to enlarge a cabin space for the distance.

Further, the seat portion 26a of the battery support 26 supporting the battery 25 is supported on the front side member 13 via the leg portion 26b. The leg portion 26b is bent to L-shape in transverse cross-section in a central portion thereof in a back and forth direction so as to have a bent transverse cross-sectional configuration. Further, the leg portion 26b is positioned such that the opening side thereof is faced in the lateral direction. Therefore, when the front side member 13 is deformed and contracted in the back and force direction due to the impact F applied from a vehicle front side, the leg portion 26b can be applied with the bending force in the closing direction. As a result, the leg portion 26b can be relatively easily deformed (the V-shape) in the closing direction. Therefore, the front side member 13 can be smoothly displaced in the axial compression direction, so that the impact absorption capacity thereof cannot be reduced. In addition, when the cress-sectional configuration of the leg portion 26b is deformed (the L-shape to the V-shape) in the closing direction, the support stiffness of the leg portion 26b against the impact F applied from the vehicle front side can be reduced. Therefore, the battery 25 can be easily moved backward, so as to increase impact absorption capacity of the body structure 1.

Thus, due to axial stress of the leg portion 26b that is bent to the L-shape in transverse cross section, the leg portion 26b may have a sufficient support stiffness for the battery 25. Conversely, when the large impact F is applied to the front side member 13 from the front side, the leg portion 26b can be relatively easily deformed in the closing direction, so that the support stiffness of the leg portion 26b can be reduced. As a result, the leg portion 26b can move the battery 25 backward without reducing the impact absorption capacity of the front side member 13 due to deformation in the axial compression direction. As a result, the sus-tower 20 can move backward while rotating around the front pillar 2. Therefore, the dash panel 10 can be restricted from moving backward, so that the vehicle interior 12 can be more reliably protected.

The present embodiment can be variously modified. For example, the left sus-tower 20 has been described. However, the invention can be applied to the right sus-tower.

Further, the exemplified body structure 1 can be applied to only the sus-tower positioned adjacent to the brake booster 15 and not to both of the right and left sus-towers.

Further, the dash center portion 10a needs not be depressed. In addition, the dash panel can be integrally formed by press forming and not be formed as the divided structure.

The invention claimed is:

1. A body structure of a vehicle in which an engine room and a vehicle interior are separated by a dash panel, in which a suspension tower supporting a suspension is disposed in the engine room and extends upward from a front side member, in which a brake booster is supported on a front surface of the dash panel while being positioned behind the suspension tower, and in which a brake pedal and a steering column are supported on a rear surface of the dash panel,
   wherein a battery is positioned in front of the suspension tower while the battery is offset from the suspension tower in a vehicle widthwise direction,
   wherein the battery is substantially supported on the front side member via a battery support, and
   wherein when the battery moves backward by an impact applied from a vehicle front side, the suspension tower can be pushed by the battery, so as to move backward while rotating around a front pillar,
   wherein an impact absorption portion bulged forward is formed in the front surface of the dash panel while being positioned below the brake booster,
   wherein the impact absorption portion is formed as a portion of the dash panel by partially deforming the dash panel,
   wherein the suspension tower is integrally connected to the impact absorption portion, and
   wherein the impact absorption portion can be deformed by the impact applied from the vehicle front side, so that the suspension tower can be moved backward.

2. The body structure as defined in claim 1, wherein the dash panel is depressed toward the vehicle interior in a central portion thereof, wherein the impact absorption portion is formed in the one of right and left side portions of the dash panel, and wherein the suspension tower is connected to the dash panel via the impact absorption portion as a rear wall.

3. The body structure as defined in claim 1 or claim 2, wherein a seat portion of the battery support supporting the battery is supported on the front side member via a leg portion, and wherein the leg portion is bent in transverse cross section in a central portion thereof in a back and forth direction so as to have a bent transverse cross-sectional configuration.

* * * * *